Patented Aug. 19, 1947

2,425,926

UNITED STATES PATENT OFFICE 2,425,926

LEAD RESINATE AND METHOD OF PRODUCING

Herschel A. Elliott, Wilmington, Del., assignor to Hercules Powder Company, Wilmington, Del., a corporation of Delaware No Drawing. Application September 4, 1941, Serial No. 409,539

12 Claims. (Cl. 260—105)

This invention relates to the production of fused lead resinates and more particularly to fused lead resinates of improved characteristics and to the method of production thereof.

Wood and gum rosins have been combined with lead compounds to form the corresponding lead salts of the rosin acids. The production of such lead resinates has been carried out either by fusing the rosin with a reactive lead compound or by a double decomposition procedure involving treatment of a water-soluble salt of the rosin with a soluble lead salt. By such procedures acid resinates or neutral resinates have been prepared containing an amount of lead up to the theoretical amount required to give the neutral salt such as lead diabietate.

It is an object of this invention to provide lead resinates of higher lead content than has heretofore been possible.

It is another object to provide fused lead resinates of high lead content which possess many improved characteristics.

It is a further object to provide a method of producing fused lead resinates of high metal content.

Other objects of the invention will appear hereinafter.

The above objects may be accomplished in accordance with this invention by fusing a lead compound capable of reaction with rosin, at a temperature in the range of about 200° C. to about 330° C. with a rosin which has been previously subjected to a heat treatment at a temperature in the range of about 250° C. to about 350° C. until the optical rotation of the rosin in the solid state has reached the range of about +20° to about +60° and preferably from about +30° to about +50°. It has been found, in accordance with this invention, that by first subjecting rosin to a heat treatment to increase its optical rotation to at least about +20° and then fusing with a reactive lead compound at the above temperature it is possible to prepare lead resinates containing higher than the theoretical proportion of lead. Thus, in accordance with this invention lead resinates having a lead content from about 26% to about 40% are readily obtained by fusing the heat-treated rosin with a sufficient amount of a lead compound capable of reaction with the rosin, to give the required combining proportion of lead. The theoretical lead content of lead diresinate is 25.6%. Lead resinates containing considerably more than the theoretical lead content are therefore provided.

In carrying out the process of the invention a heat-treated rosin having a specific optical rotation from about +20° to about +60° and preferably from about +30° to about +50°, is reacted with a lead compound capable of reaction therewith to form a salt. Such a compound may be a basic lead compound or it may be a lead salt of a volatile weak acid, or any other lead compound which under the fusion conditions liberates its lead. Suitable lead compounds are, for example, lead acetate, lead lactate, lead butyrate, lead formate, lead borate, lead oxide, mixtures of lead oxide with a fatty acid lead salt as the acetate, mixtures of lead oxide and a fatty acid as acetic acid, etc. While the reactivity of lead oxide with the heat-treated rosin is satisfactory for preparation of resinates of the heat-treated rosin, it is desirable in some instances to employ it in admixture with a fatty acid or a fatty acid salt of lead to provide clear, homogeneous resinates. A small amount of calcium acetate or other fatty acid salt of calcium, zinc, cobalt, manganese, etc. may be used in a similar manner with the lead oxide. When such auxiliary agents are used, they combine partially with the heat-treated rosin also.

The reaction is performed by heating the heat-treated rosin of the above characteristics to a temperature in the range of about 200° C. to about 330° C. and adding the lead compound either gradually or at one time, preferably while agitating the mixture. Foaming accompanies the reaction and agitation serves to hold the foaming to a minimum. The foaming is more severe at the lower temperatures and the reaction is also slower. At temperatures above about 290° C. the reaction is vigorous but the yield becomes diminished due to volatilization of the light ends from the heat-treated rosin. Preferable temperatures for the reaction therefore are from about 200° C. to about 290° C.

The time of reaction to form the novel resinates is dependent on the temperature employed, the particular lead compound used, the degree of agitation, the amount of metal being introduced, as well as other factors. Thus, the reaction time may be varied from about 10 minutes to several hours. Presence of an inert atmosphere, such as may be provided by carbon dioxide, nitrogen, flue gas, etc., prevents oxidation of the heat-treated rosin and the resinate at the elevated temperatures employed and is therefore desirable, though not essential.

The heat-treated rosin which has been found to be useful in carrying out this invention may be obtained by methods well known in the art. It has been recognized that heating of a natural rosin, as wood or gum rosin, at temperatures of 250° C. to 350° C. brings about both chemical and physical transformations in the rosin. The heat treatment has been carried out both in the presence and absence of an inert atmosphere and the same fundamental changes appear to occur. The specific optical rotation increases in the positive direction as the heat treatment progresses. The crystallizing tendencies of the rosin also decrease and the rosin becomes bleached in color as the heat treatment is prolonged. It is not known which of these chemical and physical changes is responsible for the different behavior of the rosin in the production of lead resinate by the fusion method. It is probably a combination of each of the transformations which provides such a pronounced effect in resinate formation.

The most accurate means of defining the heat-treated rosins which possess the necessary characteristics for practice of this invention is by means of the specific optical rotation as measured on the solid rosin. Thus, it has been found that when the optical rotation of the heat-treated rosin, as measured on the solid rosin, reaches +20° the characteristic of forming lead resinates of higher than theoretical lead content for the diresinate is first observed. This characteristic is most pronounced when the heat treatment has been sufficient to raise the optical rotation to +30°. When the optical rotation is above +30° the heat-treated rosin will be substantially non-crystalline and non-crystallizing. It will also be substantially lighter in color than the rosin from which it was produced, thereby providing an improvement in the color of the resinate. The heating time required to provide the desired changes in the rosin will vary with the particular temperature employed. It may be from about 5 minutes to as long as 8 hours.

The novel lead resinates described in accordance with this invention will be sharply differentiated from the prior art lead resinates in their higher lead contents. They will thus be more desirable in the various uses of lead resinate, as in driers for paints and varnishes, in printing inks, etc. They will be clear, homogeneous and substantially neutral resins.

The following specific examples illustrate the various embodiments of the invention:

Example 1

A heat-treated wood rosin was obtained by subjecting N wood rosin to a heat treatment at a temperature of 310 to 315° C. until the optical rotation reached +40°. The heat-treated rosin obtained had an acid number of 133 and a melting point (drop) of 74° C. Three hundred fifty parts by weight of the heat-treated rosin were then melted and heated to a temperature of 230° C. To the molten rosin, 440 parts by weight of lead acetate were added in small portions at a time with agitation, allowing time between each addition for the reaction to become complete as evidenced by the reduction in the foaming and evolution of the acetic acid. The temperature was raised gradually during the addition to a maximum of 260° C. A total addition time of 35 minutes was employed. The cooled lead resinate obtained was a clear, homogeneous rosin-like product having a melting point (drop) of 142° C. and a lead content of 40%.

Example 2

A heat-treated gum rosin was prepared by subjecting WW gum rosin to a heat-treatment at a temperature of 310 to 315° C. until the optical rotation reached +43°. The heat-treated rosin so obtained had an acid number of 125 and a melting point (drop) of 80° C. One hundred parts by weight of the heat-treated rosin so obtained were melted and heated to a temperature of 230° C. under a nitrogen atmosphere. To the molten rosin 80 parts by weight of lead acetate were added in small portions at a time with agitation, allowing time between each addition for the reaction to become complete. The temperature was raised gradually to 290° C. during the addition. A total addition time of 30 minutes was involved. The cooled resinate obtained was a clear, homogeneous resin having a lead content of 30% and a melting point (drop) of 135° C.

Example 3

A heat-treated gum rosin was prepared by heating WW gum rosin at a temperature of 310 to 315° C. until the optical rotation reached +41°. The heat-treated rosin resulting had an acid number of 127 and a drop melting point of 82.5° C. To 100 parts by weight of this heat-treated rosin at a temperature of 240° C., 115 parts by weight of lead acetate were added gradually in small portions at a time over a period of 10 minutes. An atmosphere of carbon dioxide was maintained during the addition and the temperature was raised gradually to 275° C. The cooled resinate obtained contained 38.5% of lead and had a drop melting point of 145° C. It was a clear, homogeneous resin.

From the above description and illustrative examples it will be apparent that the invention provides an important advance in the art of lead resinate manufacture. Thus it provides a simple and economical method for producing clear and homogeneous lead resinates of higher than theoretical lead content. The novel lead resinates resulting from the improved method are considerably more useful than the prior resinates of lower lead content.

It will be understood that the details and examples are illustrative only and that the invention as herein broadly described and claimed is in no way limited thereby.

What I claim and desire to protect by Letters Patent is:

1. A lead resinate of a heat-treated rosin, said resinate having a lead content from about 26% to about 40%, said heat-treated rosin being the product obtained by a process consisting of heating a natural rosin to a temperature in the range of about 250° C. to about 350° C. until the specific optical rotation has reached the range of about +20° to about +60°.

2. A lead resinate of a heat-treated rosin, said resinate having a lead content from about 26% to about 40%, said heat-treated rosin being the product obtained by a process consisting of heating a natural rosin to a temperature in the range of about 250° C. to about 350° C. until the specific optical rotation has reached the range of about +30° to about +50°.

3. A lead resinate of a heat-treated rosin, said resinate having a lead content from about 26% to about 40%, said heat-treated rosin being the product obtained by a process consisting of heating wood rosin to a temperature in the range of about 250° C. to about 350° C. until the specific optical rotation has reached the range of about +20° to about +60°.

4. A lead resonate of a heat-treated rosin, said resinate having a lead content from about 26% to about 40%, said heat-treated rosin being the product obtained by a process consisting of heating gum rosin to a temperature in the range of about 250° C. to about 350° C. until the specific optical rotation has reached the range of about +20° to about +60°.

5. A lead resinate of a heat-treated rosin, said resinate having a lead content from about 26% to about 40%, said heat-treated rosin being the product obtained by a process consisting of heating wood rosin to a temperature in the range of about 250° C. to about 350° C. until the specific optical rotation has reached the range of about +30° to about +50°.

6. A lead resinate of a heat-treated rosin, said resinate having a lead content from about 26% to about 40%, said heat-treated rosin being the product obtained by a process consisting of heating gum rosin to a temperature in the range of about 250° C. to about 350° C. until the specific optical rotation has reached the range of about +30° to about +50°.

7. The method of producing a lead resinate of a heat-treated rosin, said resinate having a lead content from about 26% to about 40% which comprises fusing a heat-treated rosin with a lead compound capable of reaction with the heat-treated rosin, in an amount sufficient to give a resinate of the above-defined lead content at a temperature within the range of about 200° C. to about 330° C., said heat-treated rosin being the product obtained by a process consisting of heating a natural rosin to a temperature in the range of about 250° C. to about 350° C. until the specific optical rotation has reached the range of about +20° to about +60°.

8. The method of producing a lead resinate of a heat-treated rosin, said resinate having a lead content from about 26% to about 40% which comprises fusing a heat-treated rosin with a lead compound capable of reaction with the heat-treated rosin, in an amount sufficient to give a resinate of the above-defined lead content at a temperature within the range of about 200° C. to about 290° C., said heat-treated rosin being the product obtained by a process consisting of heating a natural rosin to a temperature in the range of about 250° C. to about 350° C. until the specific optical rotation has reached the range of about +20° to about +60°.

9. The method of producing a lead resinate of a heat-treated rosin, said resinate having a lead content from about 26% to about 40% which comprises fusing a heat-treated rosin with a lead compound capable of reaction with the heat-treated rosin, in an amount sufficient to give a resinate of the above-defined lead content at a temperature within the range of about 200° C. to about 330° C., said heat-treated rosin being the product obtained by a process consisting of heating a natural rosin to a temperature in the range of about 250° C. to about 350° C. until the specific optical rotation has reached the range of about +30° to about +50°.

10. The method of producing a lead resinate of a heat-treated rosin, said resinate having a lead content from about 26% to about 40% which comprises fusing a heat-treated rosin with lead acetate in an amount sufficient to give a resinate of the above defined lead content at a temperature within the range of about 200° C. to about 330° C., said heat-treated rosin being the product obtained by a process consisting of heating a natural rosin to a temperature in the range of about 250° C. to about 350° C. until the specific optical rotation has reached the range of about +20° to about +60°.

11. The method of producing a lead resinate of a heat-treated rosin, said resinate having a lead content from about 26% to about 40% which comprises fusing a heat-treated rosin with a mixture of lead oxide and lead acetate in an amount sufficient to give a resinate of the above-defined lead content at a temperature within the range of about 200° C. to about 330° C., said heat-treated rosin being the product obtained by a process consisting of heating a natural rosin to a temperature in the range of about 250° C. to about 350° C. until the specific optical rotation has reached the range of about +20° to about +60°.

12. The method of producing a lead resinate of a heat-treated rosin, said resinate having a lead content from about 26% to about 40% which comprises fusing a heat-treated rosin with lead oxide in an amount sufficient to give a resinate of the above-defined lead content and in the presence of a small amount of calcium acetate as catalyst at a temperature within the range of about 200° C. to about 330° C., said heat-treated rosin being the product obtained by a process consisting of heating a natural rosin to a temperature in the range of about 250° C. to about 350° C. until the specific optical rotation has reached the range of about +20° to about +60°.

HERSCHEL A. ELLIOTT.

REFERENCES CITED

The following references are of record in the file of this patent:

UNITED STATES PATENTS

| Number | Name | Date |
|---|---|---|
| 1,884,407 | Romaine | Oct. 25, 1932 |
| 2,072,628 | Brennan et al. | Mar. 2, 1937 |
| 2,157,767 | Long | May 9, 1939 |
| 2,175,491 | Stresen-Reuter et al. | Oct. 10, 1939 |
| 2,138,183 | Littmann | Nov. 29, 1938 |
| 2,225,246 | Hasselstrom | Dec. 17, 1940 |
| 2,285,458 | Pragoff | June 9, 1942 |
| 2,247,399 | Palmer et al. | July 1, 1941 |
| 2,346,993 | Palmer et al. | Apr. 18, 1944 |
| 2,346,994 | Palmer et al. | Apr. 18, 1944 |
| 2,241,541 | Ender | May 6, 1941 |

OTHER REFERENCES

Ruzicka: Helvitica Chemica Acta, vol. 5, 1922, p. 338.

Du Pont et al.; Chimie et Industrie, special number (pp. 552 to 554), vol. 19, April 1929.

Fleck et al.: Journ. Amer. Chem. Soc., vol. 61, No. 2, page 247.